July 28, 1931.  W. T. BARKER, JR  1,816,463

APPARATUS FOR FEEDING MOLTEN GLASS

Filed July 14, 1925

Inventor:
William T. Barker, Jr.
by Robson S. Brown
Atty.

Patented July 28, 1931

1,816,463

UNITED STATES PATENT OFFICE

WILLIAM T. BARKER, JR., OF HARTFORD, CONNECTICUT, ASSIGNOR TO HARTFORD-EMPIRE COMPANY, OF HARTFORD, CONNECTICUT, A CORPORATION OF DELAWARE

APPARATUS FOR FEEDING MOLTEN GLASS

Application filed July 14, 1925. Serial No. 43,446.

This invention relates to apparatus for feeding molten glass and more particularly to feeders of that type which employ a reciprocating implement, such as a plunger, to control or regulate the discharge of glass to form mold charges.

The general object of the present invention is to provide a glass feeder in which the character of movement of the discharge-regulating implement can be adjusted so that different parts of each stroke of the implement may occur at the desired speed.

Another object of the invention is to provide a mechanism for actuating a feeder implement in which the character of the stroke can be adjusted during the operation of the machine so that slight changes in the shape of the mold charge may be made progressively and the results observed until the desired shape is obtained.

A further object of the invention is to provide a feeder of the character designated which shall be simple and durable in construction and which shall obviate the necessity of substituting parts to obtain the desired shape of the mold charge.

These objects and such others as will hereinafter appear will be best understood from the following description taken in connection with the accompanying drawings, in which.

Glass feeders of the type above indicated usually comprise a container for the molten glass having a submerged outlet and a plunger projecting into the glass over the outlet. The plunger is reciprocated toward and from the outlet and in order to impart the desired shape to the mold charges, the plunger speeds are varied during each stroke so that one part of the stroke occurs at a faster speed than another part. In one typical practice, the plunger usually starts up at a relatively high speed which is reduced before the plunger is half way up. Conversely, the plunger starts its down stroke at a slow speed, which is increased before the end of the stroke. In order to permit adjustment and control of the shape of the mold charges, it is desirable that means be provided for changing the speeds and the relation between the slower and faster parts of each plunger stroke.

According to my present invention, I provide plunger-operating mechanism in which the up-stroke of the plunger is produced by means of two actuators, lever systems, for example, acting successively to lift the plunger first at a relatively rapid rate and then at a slower rate. The same actuators control the descent of the plunger, which is first relatively slow and then more rapid. The time at which the control of the plunger passes from one of the actuating means to the other is adjustable to vary the speed of the rapid rise in respect to that of the slower rise, and other adjustments are provided for altering the length and position of the plunger stroke. In the specific embodiment of my invention to be described below, the two actuating lever systems are combined in a compound toggle mechanism.

Figure 1:
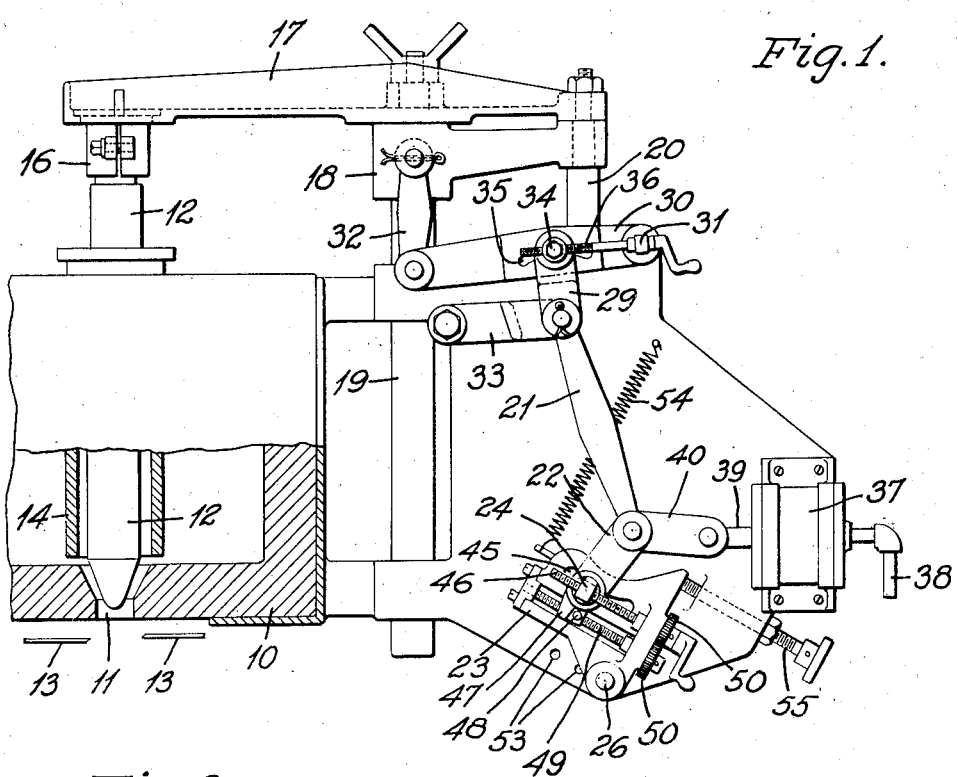
Figure 1 is a partial front elevation of a glass feeder embodying the present invention.

In the drawings, Fig. 1 indicates conventionally a molten glass container or forehearth 10 having a submerged outlet 11. The discharge of glass from the outlet is regulated by a reciprocating plunger 12 and the flow of glass to the outlet is controlled by a vertically adjustable tube 14 which surrounds the plunger 12. Shears 13 are operated below the outlet in timing relation with the plunger movement, to sever mold charges from the discharged glass. The plunger 12 is secured in a chuck 16 mounted in an arm 17 adjustably secured to a bracket 18. The bracket 18 is provided with rods 19 and 20 by which it is guided for vertical reciprocation.

The parts thus far described are well known in the art and form no essential part of the present invention. A more complete description thereof may be found in the copending application of Karl E. Peiler, Serial No. 683,576, filed December 31, 1923.

Figure 3:
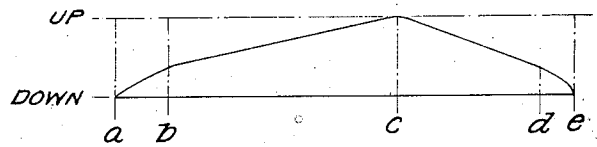
Fig. 3 is a curve graphically illustrating the varying rate of movement of the plunger during each stroke.

Feeders of this general type usually employ compressed air or a cam mechanism to reciprocate the plunger. When the plunger is reciprocated by compressed air acting on a piston in a cylinder, no attempt is made to control adjustably the rate of plunger movement during any part of its stroke with relation to another part of the same stroke. Certain feeders employing cams to reciprocate the plunger have provided for varying the speed of the plunger during a single stroke to produce useful shaping effects on suspended mold charges, and such speed variations are indicated in a general way by the graphic curve in Fig. 3. In this curve, $a$ represents the plunger at its lowermost position. The first part of the rising plunger movement from $a$ to $b$ is comparatively rapid, while the remainder of the upward stroke from $b$ to $c$ is at a slower rate. On the downward stroke, the first portion $c$ to $d$ is comparatively slow and the final downward movement from $d$ to $e$ is at an increased speed. One of the most important factors in shaping a suspended mold charge during extrusion is the final portion of the downward stroke, represented by the curve $d$—$e$ and important modifications in the shape of the mold charge may be produced by varying the speed of this part of the plunger stroke. In cam-actuated feeders of the prior art, it has been necessary to substitute new cams in order to change the speed of a portion of the plunger stroke and this has necessitated stopping the feeder and interrupting the production of ware. In feeders with piston-actuated plungers, any attempt to change the speed of one portion of the plunger stroke has resulted in undesirable changes in other portions of the stroke.

The present invention contemplates the provisions of a feeder in which the speed of plunger movement may be adjusted to vary the speed of one part of its stroke with relation to another part of the same stroke. This object is accomplished by the interposition, between the plunger and the primary driving means (whether cam, piston or other means), of an adjustable drive connecting means which operates to produce a plunger movement of different speeds at different portions of the stroke, and means is provided for adjusting the speed of the plunger in such different portions.

In the preferred embodiment of the invention, the rising and falling movement of the plunger are controlled by levers and links which, as a matter of convenience, are incorporated in a toggle construction. The general operation of this plunger-actuating mechanism will best be understood from Fig. 2 which is a diagrammatic view representing the toggle mechanism including the levers 21, 22 and 23, with all adjusting devices and mechanical details omitted. The upper end of the toggle arm 21 is connected with the plunger as will be hereinafter described and power is applied in a horizontal direction to the joint of the toggle indicated by the arrow. The plunger is elevated by straightening the toggle and is lowered when the toggle is broken. To raise the plunger, power is applied in the direction of the arrow and the first part of this movement straightens a toggle composed of the upper arm 21 and the short arm 22. The arm 22 turns about its pivot 24, the joint of the toggle describing an arc 25, thereby giving a comparatively quick rise to the plunger. After the arm 22 has turned about its pivot to a predetermined and adjustable extent, the further application of power acts on a toggle comprising the same upper arm 21 and a long lower arm comprising the arms 22 and 23. These arms act as a single unitary arm 22—23 swinging about its pivot 26 and causing the toggle joint to describe an arc 27, which produces a relatively slow rising movement of the plunger.

On the lowering movement of the plunger, the operations above described occur in the reverse order, thereby causing the plunger to be lowered slowly at first and then more rapidly during the final portion of the stroke.

Referring now to Fig. 1 for a more detailed description of the apparatus, the connection between the upper end of the toggle arm 21 and the plunger comprises a link 29 connecting the toggle arm with a lever 30 mounted on a fixed pivot 31 on the machine frame. The free end of the lever 30 is connected by a link 32 with the bracket 18 carrying the plunger. The upper end of the toggle arm 21 is guided in its movements by a radius arm 33 mounted on a fixed pivot on the machine frame. In order that the stroke of the plunger may be increased or decreased while maintaining the same lowermost position on each stroke, the connection between the link 29 and the lever 30 comprises a stud 34 sliding in an arcuate slot 35 in the lever 30. The stud 34 may be moved in the slot 35, to vary the throw of the lever 30, by a screw 36 threaded into the stud 34 and rotatably mounted in a bearing coincident with and forming a part of the pivot connection 31 of the lever 30.

Power is applied to the joint of the toggle by a pressure operated piston and cylinder 37 mounted on the machine frame. Motive fluid is suplied to the cylinder from a suitable source by a conduit 38. A piston rod 39 connects with the joint of the toggle arms by a link 40 in order to provide for the slight vertical movement of the toggle during its operation.

Figure 2:
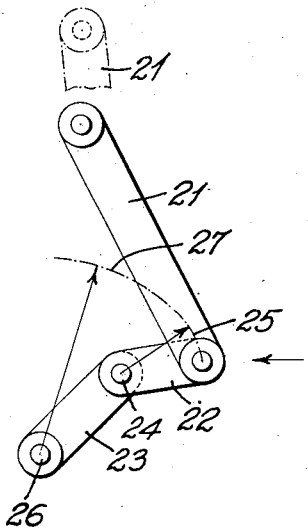
Fig. 2 is a diagram illustrating the operation of the particular mechanism shown in Fig. 1 for reciprocating the plunger.

The short lower toggle arm 22 is substantially as shown in the diagram of Fig. 2, but for the purpose of providing for various adjustments, the longer toggle arm 23 is shaped as shown in Fig. 1. The pivot 24 of the short arm 22 is carried by the arm 23 and in order to provide means for varying the elevating movement imparted by the swinging of the toggle arm 22, the pivot 24 is adjustably held in an arcuate slot 45 formed in the arm 23. The pivot 24 of the arm may be moved by a screw 46 threaded into the pivot 24. The screw is rotatably mounted on the arm 23, and the pivot 24 is constructed to permit a relative movement of the pivot parts in moving along the arcuate slot. The slot 45 is struck on a radius from the toggle joint so that adjustment of the pivot 24 in the slot may be made without producing vertical movement in the upper toggle arm and the plunger.

The means for limiting the swinging movement of the arm 22 about its pivot 24 comprises a finger 47, projecting downwardly from the arm 22, and a movable stop 48. This stop determines the angular movement of the arm 22 that is permitted prior to movement of the arm 23, and in order that the angle of this movement may remain substantially constant notwithstanding adjustments of the pivot 24 in the slot 45, it is preferred to mount the stop 48 on a nut threaded on a screw 49. The screw 49 is connected by gears 50 with the screw 46 and the ratio of the gears or if preferred, the ratio of the threads on the two screws, is such that, when the screws are turned, the stop moves in relation to the pivot 24 so that the same angular swing is always permitted in the arm 22 before the finger 47 engages the stop. Maintaining the same angular movement of the arm 22 in all adjusted positions, maintains the transition points $b$ and $d$ (Fig. 3) at the same places in the cycle of operation of the machine. If it should be desired to change this point of transfer of the control of the plunger movement from the higher-speed operating device to the lower-speed operating device, this may be done by disconnecting the gears 50 and turning one independently of the other.

The arm 23 is connected to the machine frame by a fixed pivot 26, but if it should be desired to change the speed of movement during the slower part of the plunger stroke, that is, during the curve $b$—$d$ (Fig. 3), this may be done by changing the pivot 26 into one of a series of holes 53 provided in the frame 31, or other well-known means of adjusting the location of the pivot 26 may be employed.

The arm 23 is held to the right, in a clockwise direction as shown in Fig. 1, by a spring 54 which, when the plunger is down, holds the arm against an adjustable stop screw 55. In order to adjust the lowermost point of the plunger stroke, the stop screw 55 may be adjusted to vary the retracted position of the arm 23.

The operation of the device has been set out in considerable detail in connection with the description of the parts. It will be observed that the speed of movement represented by the curves $a$, $b$ and $d$, $e$ may be changed by turning the screw 46 (Fig. 1) while maintaining the same duration of these movements. If it is desired to modify the curve $b$, $d$, this may be done by changing the position of the pivot 26 in the holes 53. The duration of the more rapid parts of the plunger movement ($a$, $b$, and $d$, $e$) may be modified by turning the screw 49 independently of the screw 46. Thus controlling means are provided by which the speed and duration of the slower and faster portions of the same plunger stroke may be independently adjusted in order to secure the desired shape of mold charge.

A cam may be employed, if desired, for supplying power to the toggle joint, instead of the fluid pressure cylinder 37 shown herein. Such a cam may give the toggle joint a regular reciprocation similar to that imparted by a fluid pressure cylinder; or if desired, the contour of the cam may be so designed as to increase or decrease the speed of any particular part of the plunger reciprocation.

Having described the preferred embodiment of the invention, what is claimed as new is:

1. Apparatus for feeding molten glass, comprising a reciprocating implement to control the discharge of glass from a container, means for moving the implement in reciprocating strokes, and means for varying the speed of one portion of a stroke with respect to the speed of another portion of said stroke and for maintaining the same differential speeds for subsequent corresponding strokes of the implement until a further adjustment of said speed varying means has been effected.

2. Apparatus for feeding molten glass from a submerged outlet in a container and under the control of a reciprocating plunger, comprising a plurality of devices operating successively to move the plunger at different speeds during different portions of a single stroke, and means to permit independent adjustment of one of said devices relative to the other to vary the speed of the plunger movement produced by said device.

3. Apparatus for feeding molten glass from a submerged outlet in a container and under the control of a reciprocating plunger, comprising means for moving the plunger at a relatively high speed, means for moving the plunger at a relatively-low speed, and means for adjusting the time at which the control of the plunger passes from one of said means to the other.

4. In apparatus for feeding molten glass from a submerged outlet in a container, the combination with a movable implement for discharging glass periodically through the outlet, of means for reciprocating the implement comprising a plurality of pivotally movable levers operatively connected together, a limit stop on one of said levers, and means for successively moving the levers about their respective axes to cause one of said levers to engage the stop whereby the levers move the implement at one speed prior to engagement with the stop and then at another speed after engagement with said stop.

5. In an apparatus for feeding molten glass from a container, the combination of a glass feeding implement having a variable rate of motion, a lever mechanism consisting of a plurality of pivotally connected levers for operating said implement, and means for adjusting the pivot axis of certain levers of the mechanism whereby a change in the motion of the feeding implement is effected.

6. In an apparatus for feeding molten glass from a container, the combination of a glass feeding implement, a lever mechanism for operating said implement consisting of a plurality of pivotally connected levers, and means associated with the levers for automatically causing the pivot axis of one of the levers to be changed after the initial movement of the implement, whereby variable rate of motion is imparted to said feeding implement.

7. In an apparatus for feeding molten glass from a container, the combination of a glass feeding implement, mechanism for operating the implement comprising a plurality of movably mounted levers operatively connected to actuate said implement, and means associated with the levers for causing said levers to begin their operating movements at different times so that a variable rate of motion is imparted to said feeding implement.

8. In apparatus for feeding molten glass from a container having a discharge outlet, the combination with a discharge regulating implement movable toward and from the outlet, of an operating mechanism for said implement including a plurality of pivoted lever arms mounted on different axes, and means for initiating swinging movement of said lever arms at different times in a cycle of operation of said operating means so that a variable speed motion will be imparted to said implement.

9. Apparatus for feeding molten glass from the submerged outlet of a container, the combination of a plunger having a variable rate of motion toward and from the outlet, a pivoted compound lever operatively connected with the plunger and comprising two arms pivotally connected together, means for moving one arm about its pivotal connection on the other arm and for moving the compound lever about its pivot, and means associated with the lever for changing the range of motion of the feeding implement independently of the rate of motion of said moving means.

10. In apparatus for feeding molten glass from the submerged outlet of a container, the combination of a plunger movable toward and from the outlet, a pivoted compound lever operatively connected with the plunger and comprising two arms pivotally connected together, and means for moving one arm about its pivotal connection on the other arm, and for moving the compound lever whereby a variable rate of motion is imparted to the plunger.

11. In apparatus for feeding molten glass from the submerged outlet of a container, the combination with a movable implement for discharging glass periodically through the outlet, of means for reciprocating the implement comprising a system of levers operatively connected with the plunger, means for successively moving the levers about their respective axes, and means operatively associated with the pivotal connection of a pair of said levers, one of which is connected to a fixed pivot, whereby an initial movement of one lever takes place about the pivotal connection, and whereby continued movement thereof causes both levers to swing about the fixed pivot.

12. In an apparatus for feeding molten glass from a container, the combination of a glass feeding implement, a lever mechanism for operating said implement consisting of a plurality of pivotally connected levers, means for adjusting the angular position of the levers, and means associated with the levers for automatically imparting movement of said levers at different times, whereby a change is produced in the character of movement imparted to the implement.

13. In apparatus for feeding molten glass from a submerged outlet of a container, the combination with a plunger movable toward and from the outlet, of a plurality of levers mounted on different axes for operating the plunger, means for moving the plunger by the swinging movements of the levers successively about their respective axes, and means for adjusting the axis of a pair of connected levers whereby a change in the cycle of operation of the plunger is effected.

14. In apparatus for feeding molten glass from the submerged outlet of a container, the combination with a movable implement for discharging glass periodically through the outlet, of a frame support for the implement, means for reciprocating the implement, comprising a system of levers operatively connected with the plunger and the support, a toggle mechanism mounted on said support and connecting with one of said levers, means for adjusting the relative positions of the levers for changing the range of motion of the plunger independently of the toggle mechanism, and means associated with the toggle mechanism for varying the rate of reciprocation imparted to the implement.

15. In apparatus for feeding molten glass from the submerged outlet of a container, the combination with a movable implement for discharging glass periodically through the outlet, of a frame support for the implement, means for reciprocating the implement, comprising a system of levers operatively connected with the plunger and the support, a toggle mechanism mounted on said support and connecting with one of said levers, means associated with the lever mechanism for independently changing the range of reciprocation of the implement from a predetermined low position, and means included in the toggle mechanism for independently changing the rate of motion imparted to the implement at each reciprocation.

16. In apparatus for feeding molten glass from the submerged outlet of a container, the combination with a movable implement for discharging glass periodically through the outlet, of a frame support for the implement, means for reciprocating the implement, comprising a system of levers operatively connected with the plunger and the support, a toggle mechanism mounted on said support and connecting with one of said levers, means associated with the lever mechanism for independently changing the range of reciprocation of the implement from a predetermined low position, means included in the toggle mechanism for independently changing the rate of motion imparted to the implement at each reciprocation, and means for adjusting the low position of the implement.

17. In apparatus for feeding molten glass from the submerged outlet of a container, the combination with a movable implement for discharging glass periodically through the outlet, of a frame support for the implement, means for reciprocating the implement, comprising a system of levers operatively connected with the plunger and the support, a toggle mechanism mounted on said support and connecting with one of said levers, means associated with the lever mechanism for independently changing the range of reciprocation of the implement from a low position, means included in the toggle mechanism for independently changing the rate of motion imparted to the implement at each reciprocation, and means included in the toggle mechanism for adjusting the low position of the implement.

18. In apparatus for feeding molten glass from the submerged outlet of a container, the combination with a movable implement for discharging glass periodically through the outlet, of a frame support for the implement, means for reciprocating the implement, comprising a system of levers operatively connected with the plunger and the support, a toggle mechanism mounted on said support and connecting with one of said levers, means associated with the lever mechanism for independently changing the range of reciprocation of the implement from a low position, and means included in the toggle mechanism for changing the angular relation of the toggle arms and for maintaining the low position of the implement constant for said adjustments.

19. Apparatus for feeding molten glass comprising a reciprocating implement to control the discharge of glass from a container, a pneumatic motor for moving the implement in reciprocating strokes, and means in the connection between the motor and the implement for causing the implement to move at different speeds during a single stroke of the motor.

20. Apparatus for feeding molten glass, comprising a reciprocating implement to control the discharge of glass from a container, a pneumatic motor for moving the implement in reciprocating strokes, means in connection between the implement and the motor for moving the implement at different speeds during a single stroke of said motor, and manually operable means for varying the speed of the implement at a predetermined portion of the stroke with respect to the speed of another portion of said stroke.

21. Apparatus for feeding molten glass from a submerged outlet in a container and under the control of a reciprocating plunger, comprising a lever connected to move the plunger, a second lever on which the first lever is pivotally mounted, said second lever being pivotally mounted on a fixed support, a stop to limit the swinging movement of the first lever relative to the second, and means for applying power to the first lever to swing it about its pivot on the second lever and thereafter to swing both levers as a unit about the pivot of the second lever.

22. Apparatus for feeding molten glass from a submerged outlet in a container and under the control of a reciprocating plunger, comprising a lever connected to move the plunger, a second lever on which the first lever is pivotally mounted, said second lever being pivotally mounted on a fixed support, a stop to limit the swinging movement of the first lever relative to the second, means for applying power to the first lever to swing it about its pivot on the second lever and thereafter to swing both levers as a unit about the pivot of the second lever, and means for shifting the point of pivotal connection between said levers and for thereby changing the speed of movement imparted to said plunger by the swinging movement of said first lever.

23. In apparatus for feeding molten glass from a submerged outlet in a container, the combination with a movable implement for controlling the periodic discharge of glass through the outlet, of means for reciprocating the implement comprising a system of pivoted levers operatively connected with the plunger, two of said levers being pivoted together, means for successively moving the levers about their respective pivotal axes, means associated with the said pivotal connection of said pair of said levers, and including an adjustable limit stop having cooperating parts carried by the levers, whereby an initial movement of one lever takes place about the pivotal connection, and continued movement of the levers causes the pair of levers to move as a single lever about a fixed pivot, and means for adjusting the stop to effect a change in the operative relation of said levers to change the speed of movement of the implement during a reciprocation thereof.

24. In apparatus for feeding molten glass from a container, the combination of an implement movable to regulate the discharge of glass from the container, a source of power for periodically moving the implement, mechanical connections between the implement and the source of power, and means in said connections for varying the character of the movement imparted to the implement independently of any change of said source of power and without requiring a change of the position of the path or the length of the movement of the implement.

25. In apparatus for feeding molten glass from a submerged outlet in a container, the combination with a reciprocable plunger for regulating the discharge of glass from the outlet, of a moving power applying member operating in regular cycles, mechanical connections between said power applying member and said plunger for moving the plunger, and means for varying said connections to vary the character of the movement of the plunger during the stroke thereof without requiring a change of the position of the path or the length of the stroke of the plunger.

26. In apparatus for feeding molten glass from a submerged outlet in a container, the combination with a reciprocable plunger for regulating the discharge of glass from the outlet, of mechanical connections for moving the plunger at a speed that is automatically varied during the stroke of said plunger, and manually operable means for adjusting said mechanical connections to alter the variable speed stroke of the plunger while the length of the stroke and the path of reciprocation of said plunger are kept constant.

27. In apparatus for feeding molten glass from a submerged outlet in a container, the combination with a reciprocable plunger for regulating the discharge of glass from the outlet, of means including a toggle joint for moving the plunger, and means for altering the toggle joint to vary the speed of movement of the plunger.

28. Glass feeding apparatus comprising a reciprocable feed regulating implement, means for reciprocating the implement at different speeds during different parts of a stroke thereof, and means operable during the operation of said implement to change the speed of said implement for one part of its said stroke with respect to the speed of another part of the same stroke and to maintain automatically the adjusted differential speeds for said stroke during subsequent reciprocations of the implement until a further adjustment of the implement reciprocating means has been effected.

29. In glass feeding apparatus having an implement reciprocable toward and from a discharge outlet of a glass container, operating means for reciprocating said implement, said operating means including a toggle joint adjustable during the continued operation of said implement to vary the speed of the implement for part of a stroke thereof.

30. In glass feeding apparatus, a reciprocable implement for regulating discharge of glass through an outlet of a container, means for reciprocating said implement toward and from the outlet at a higher speed for part of a stroke of the implement than for another part of said stroke, and means operable during the reciprocation of said implement to vary the speeds of movement of the implement for said different parts of said stroke relatively to each other and to maintain substantially the same variation of speed between said different parts of the stroke of the implement during subsequent reciprocation of the implement.

31. Glass feeding apparatus comprising a container having a discharge outlet in its bottom, an implement reciprocable vertically in the glass of the container in substantially axial alignment with the outlet for regulating discharge of glass through the outlet and for aiding in shaping suspended mold charge masses of glass below the outlet, means for reciprocating said implement to move said implement at a higher rate of speed during an initial part of the upstroke of the implement and the latter part of the downstroke of the implement than during the remainders of said strokes, and means operable during the operation of said implement to vary the speed of said relatively rapid parts of said strokes with respect to the speed of the slower parts of such strokes for all subsequent reciprocations of the implement until a further adjustment has been effected.

32. Glass feeding apparatus comprising a container having a discharge outlet in its bottom, an implement reciprocable vertically in the glass of the container in substantially axial alignment with the outlet for regulating discharge of glass through the outlet and for aiding in shaping suspended mold charge masses of glass below the outlet, means for reciprocating said implement, means for adjusting said reciprocating means to move said implement at a higher rate of speed during an initial part of the upstroke of the implement and the latter part of the downstroke of the implement than during the remainders of said strokes and for maintaining said speed differentials substantially constant on the subsequent strokes of the implement until a further adjustment of said speed changing means has been effected, and means for changing the relative durations of said parts of said strokes during which said implement moves at different speeds.

33. In glass feeding apparatus, a reciprocable implement for regulating discharge of glass through an outlet of a container, means for reciprocating said implement toward and from the outlet at a higher speed for part of a stroke of the implement than for another part of said stroke, and means for varying the relative durations of the parts of said stroke during which said implement moves at different speeds.

Signed at Hartford, Conn., this 9th day of July, 1925.

WILLIAM T. BARKER, JR.